US008852783B2

(12) United States Patent
Ketkar (10) Patent No.: US 8,852,783 B2
(45) Date of Patent: Oct. 7, 2014

(54) BATTERY CELL ASSEMBLY AND METHOD FOR MANUFACTURING THE BATTERY CELL ASSEMBLY

(71) Applicant: LG Chem, Ltd., Seoul (KR)

(72) Inventor: Satish Ketkar, Troy, MI (US)

(73) Assignee: LG Chem, Ltd., Seoul (KR)

(*) Notice: Subject to any disclaimer, the term of this patent is extended or adjusted under 35 U.S.C. 154(b) by 101 days.

(21) Appl. No.: 13/766,162

(22) Filed: Feb. 13, 2013

(65) Prior Publication Data

US 2014/0227575 A1    Aug. 14, 2014

(51) Int. Cl.
*H01M 10/50* (2006.01)
*H01M 10/6551* (2014.01)
*H01M 10/613* (2014.01)
*H01M 10/655* (2014.01)
*H01M 10/04* (2006.01)

(52) U.S. Cl.
CPC ...... *H01M 10/5004* (2013.01); *H01M 10/5046* (2013.01); *H01M 10/5044* (2013.01); *H01M 10/04* (2013.01)
USPC .......................................................... 429/120

(58) Field of Classification Search
CPC .. Y02E 60/12; H01M 10/04; H01M 10/5004; H01M 10/5032; H01M 10/5044; H01M 10/5046; H01M 10/5053; H01M 10/5055
USPC .......................................................... 429/120
See application file for complete search history.

(56) References Cited

U.S. PATENT DOCUMENTS

| | | |
|---|---|---|
| 2,273,244 A | 2/1942 | Cornelius |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |

(Continued)

FOREIGN PATENT DOCUMENTS

| | | |
|---|---|---|
| EP | 1577966 A | 9/2005 |
| EP | 1852925 A | 11/2007 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Stewart Fraser
(74) *Attorney, Agent, or Firm* — Buckert Patent & Trademark Law Firm, P.C.; John F. Buckert (57) ABSTRACT

A battery cell assembly is provided. The battery cell assembly includes a cooling fin having first and second plate portions and a first thermally conductive layer. The first and second plate portions are coupled to one another and extend longitudinally along a central axis. The first plate portion has a first thickness. The second plate portion has a second thickness greater than the first thickness. The first thermally conductive layer is disposed on a first outer surface of the first plate portion. The cooling fin thermally communicates with the cooling plate. The battery cell assembly further includes a first battery cell disposed against the first thermally conductive layer and the second plate portion of the cooling fin.

18 Claims, 8 Drawing Sheets

(56) References Cited

U.S. PATENT DOCUMENTS

| | | | |
|---|---|---|---|
| 4,298,904 A | 11/1981 | Koenig | |
| 4,322,776 A | 3/1982 | Job et al. | |
| 4,444,994 A | 4/1984 | Baker et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,995,240 A | 2/1991 | Barthel et al. | |
| 5,057,968 A | 10/1991 | Morrison | |
| 5,071,652 A | 12/1991 | Jones et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,937,664 A | 8/1999 | Matsuno et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,344,728 B1 | 2/2002 | Kouzu et al. | |
| 6,399,238 B1 | 6/2002 | Oweis et al. | |
| 6,462,949 B1 | 10/2002 | Parish, IV et al. | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,070,874 B2 | 7/2006 | Blanchet et al. | |
| 7,143,124 B2 | 11/2006 | Garthwaite | |
| 7,150,935 B2 | 12/2006 | Hamada et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 8,663,829 B2 * | 3/2014 | Koetting et al. | 429/120 |
| 2002/0182493 A1 | 12/2002 | Ovshinsky et al. | |
| 2003/0211384 A1 | 11/2003 | Hamada et al. | |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0087266 A1 | 4/2007 | Bourke et al. | |
| 2008/0003491 A1 | 1/2008 | Yahnker et al. | |
| 2008/0041079 A1 | 2/2008 | Nishijima et al. | |
| 2008/0182151 A1 | 7/2008 | Mizusaki et al. | |
| 2008/0248338 A1 | 10/2008 | Yano et al. | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 * | 11/2010 | Koetting et al. | 429/50 |
| 2011/0027640 A1 | 2/2011 | Gadawski et al. | |
| 2011/0041525 A1 | 2/2011 | Kim et al. | |
| 2011/0052959 A1 * | 3/2011 | Koetting et al. | 429/120 |
| 2011/0189523 A1 * | 8/2011 | Eom | 429/120 |
| 2012/0082880 A1 | 4/2012 | Koetting et al. | |
| 2012/0171543 A1 * | 7/2012 | Hirsch et al. | 429/120 |
| 2013/0255293 A1 * | 10/2013 | Gadawski et al. | 62/121 |
| 2013/0309542 A1 * | 11/2013 | Merriman et al. | 429/120 |
| 2014/0120390 A1 * | 5/2014 | Merriman et al. | 429/72 |
| 2014/0147709 A1 * | 5/2014 | Ketkar et al. | 429/50 |

FOREIGN PATENT DOCUMENTS

| | | |
|---|---|---|
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2003188323 A | 7/2003 |
| JP | 2005126315 A | 5/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |

OTHER PUBLICATIONS

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

(56) References Cited

OTHER PUBLICATIONS

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Thomas J. Gadawski et al., pending U.S. Appl. No. 13/433,649 entitled "Battery System and Method For Cooling the Battery System," filed Mar. 29, 2012.

U.S. Appl. No. 13/475,963, filed May 19, 2012 entitled Battery Cell Assembly and Method for Manufacturing a Cooling Fin for the Battery Cell Assembly.

U.S. Appl. No. 13/586,960, filed Aug. 16, 2012 entitled Battery Module.

U.S. Appl. No. 13/587,030, filed Aug. 16, 2012 entitled Battery Module and Method for Assembling the Battery Module.

U.S. Appl. No. 13/686,018, filed Nov. 27, 2012 entitled Battery System and Method for Cooling a Battery Cell Assembly.

\* cited by examiner

BATTERY CELL ASSEMBLY AND METHOD FOR MANUFACTURING THE BATTERY CELL ASSEMBLY

BACKGROUND

Battery cells may have portions thereof which are disposed distal from a cooling source. As a result, the portions of the battery cells disposed distal from the cooling source may undesirably have a higher operational temperature then portions of the battery cells disposed relatively close to the cooling source. This condition may create undesirably high thermal gradients within the battery cells.

Accordingly, the inventors herein have recognized a need for an improved battery cell assembly and a method for manufacturing the battery cell assembly that minimizes and/or eliminates the above-mentioned deficiency.

SUMMARY

A battery cell assembly in accordance with an exemplary embodiment is provided. The battery cell assembly includes a cooling fin having first and second plate portions and a first thermally conductive layer. The first and second plate portions are coupled to one another and extend longitudinally along a central axis. The first plate portion has a first thickness. The second plate portion has a second thickness greater than the first thickness. The first thermally conductive layer is disposed on a first outer surface of the first plate portion. The cooling fin is configured to thermally communicate with the cooling plate. The battery cell assembly further includes a first battery cell disposed against the first thermally conductive layer and the second plate portion of the cooling fin.

A method for manufacturing a battery cell assembly in accordance with another exemplary embodiment is provided. The method includes providing a cooling fin having first and second plate portions extending longitudinally along a central axis that are coupled to one another. The first plate portion has a first thickness. The second plate portion has a second thickness greater than the first thickness. The method further includes disposing a first thermally conductive layer on a first outer surface of the first plate portion. The method further includes disposing a first battery cell against the first thermally conductive layer and the second plate portion of the cooling fin.

DETAILED DESCRIPTION

Referring to FIGS. 1-5, a battery cell assembly 10 in accordance with an exemplary embodiment is provided. The battery cell assembly 10 includes a cooling plate 20, a cooling fin 30, a first rectangular ring-shaped frame member 40, a second rectangular ring-shaped frame member 50, a first battery cell 60, a second battery cell 70, and a cooling system 80. An advantage of the battery cell assembly 10 is that the assembly 10 utilizes the cooling fin 30 having first and second thermally conductive layers 120, 130 disposed on distal ends of the cooling fin 30 to improve thermal transfer from distal ends battery cells disposed adjacent to the first and second thermally conductive layers 120, 130.

Figure 1:
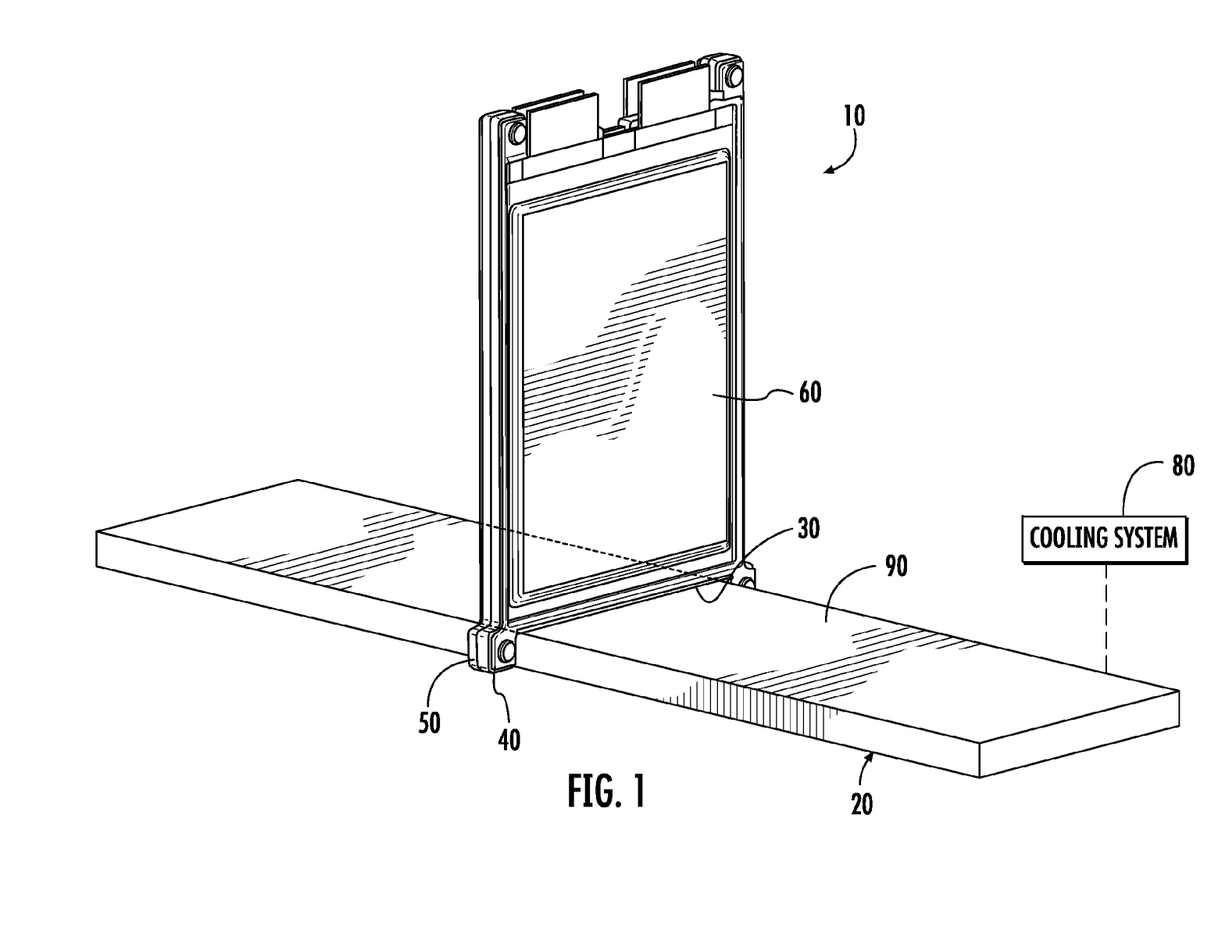
FIG. 1 is a schematic of a battery cell assembly in accordance with an exemplary embodiment.
Figure 2:
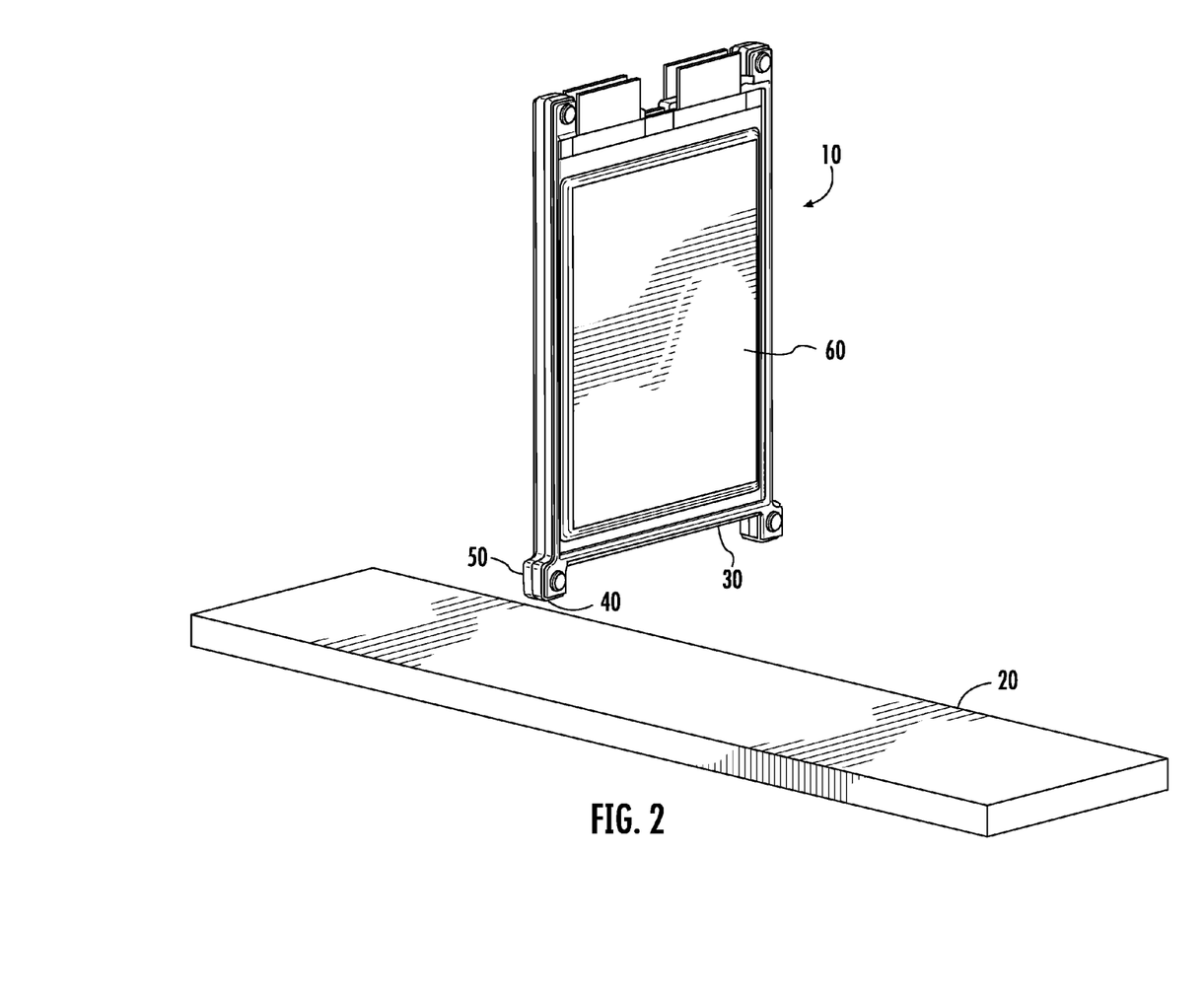
FIG. 2 is an exploded view of the battery cell assembly of FIG. 1.

Referring to FIGS. 1 and 2, the cooling plate 20 is configured to conduct heat energy from the cooling fin 30. The cooling plate 20 is constructed of a thermally conductive material that is operably coupled to the cooling system 80. The cooling system 80 cools the cooling plate 20 such that the cooling plate 20 is maintained within a predetermined temperature range. In one exemplary embodiment, the cooling system 80 routes a coolant through passages (not shown) disposed through an interior region of the cooling plate 20 such that the cooling plate 20 is maintained within a predetermined temperature range. The cooling plate 20 has an upper surface 90 configured to hold the remaining components of the battery cell assembly 10 thereon.

Referring to FIGS. 3-6, the cooling fin 30 is provided to extract heat energy from the first and second battery cell 60, 70. The cooling fin 30 includes a first plate portion 100, a second plate portion 102, a third plate portion 103, a base plate 110, a first thermally conductive layer 120, and a second thermally conductive layer 130.

Figure 6:
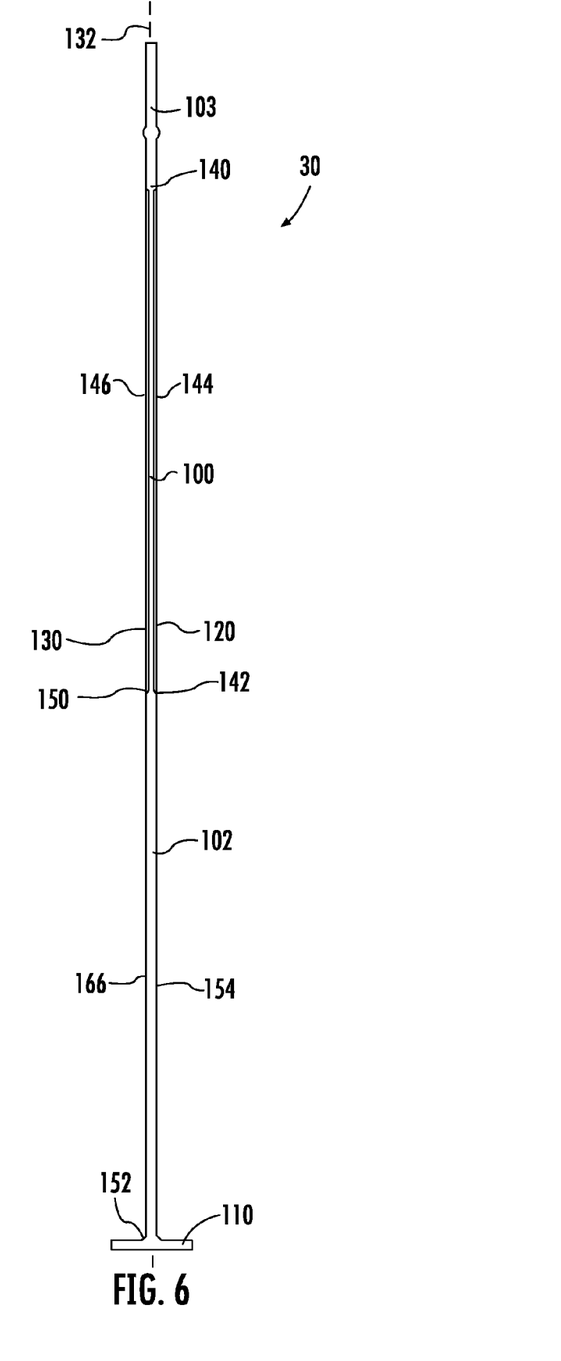
FIG. 6 is a cross-sectional view of a cooling fin utilized in the battery cell assembly of FIG. 5.
Figure 7:
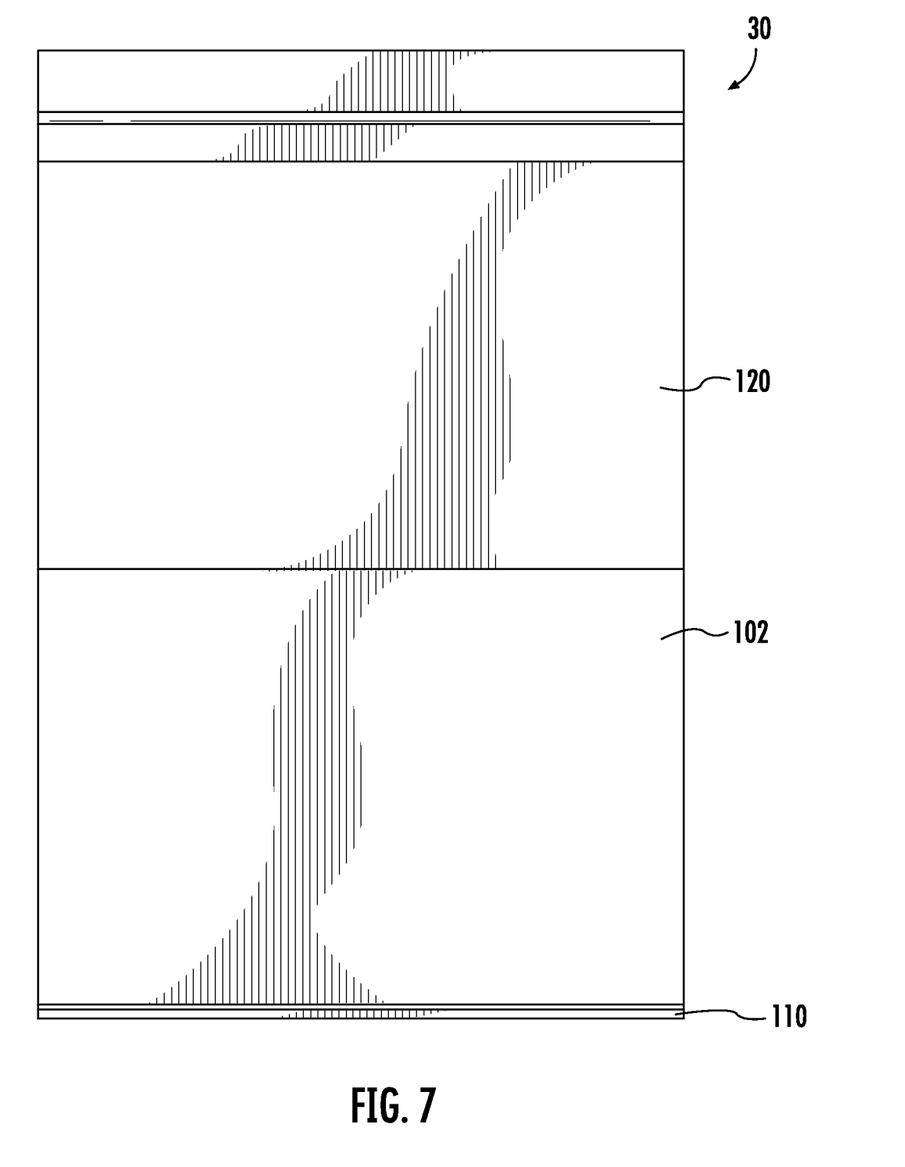
FIG. 7 is a side view of the cooling fin of FIG. 6.

The first, second, and third plate portions 100, 102, 103 are coupled to one another and extend longitudinally along a central axis 132. The first plate portion 100 has a first thickness perpendicular to the central axis 132. In one exemplary embodiment, the first plate portion 100 is a substantially rectangular-shaped plate portion. The first plate portion 100 includes a first end 140, a second end 142, a first outer surface 144, and a second outer surface 146. The second plate portion 102 has a second thickness perpendicular to the central axis 132 that is greater than the first thickness. In one exemplary embodiment, the second plate portion 102 comprises a substantially rectangular-shaped plate portion. The second plate portion 102 includes a first end 150, a second end 152, a first outer surface 154, and a second outer surface 166. The second end 142 of the first plate portion 100 is coupled to the first end 150 of the second plate portion 102. The base plate 110 is coupled to the second end 152 of the second plate portion 102, and extends substantially perpendicular to the second plate portion 102. The third plate portion 103 is coupled to the first end 140 of the first plate portion 100. The base plate 110 is configured to be disposed on the cooling plate 20 and to thermally communicate with the cooling plate 20. The first plate portion 100, the second plate portion 102, the third plate portion 103, and the base plate 110 are each constructed of a thermally conductive material such as aluminum or copper for example.

Referring to FIG. 6, the first thermally conductive layer 120 is disposed on a first outer surface 144 of the first plate portion 100. The second thermally conductive layer 130 is disposed on a second outer surface 146 of the first plate portion 100. In one exemplary embodiment, the first and second thermally conductive layers 120, 130 each comprise a flexible sheet constructed at least in part of graphite having a thickness in a range of 0.25-0.5 millimeters. For example, the first and second thermally conductive layers 120, 130 could comprise "Spreadershield SS-400" manufactured by GrafTech International Holdings Inc.

Further, the first and second thermally conductive layers 120, 130 each have a higher heat conductivity than the first and second plate portions 100, 102. For example, in one exemplary embodiment, the first and second thermally conductive layers 120, 130 have an in-plane heat conductivity of greater than 200 Watts/meter-Kelvin. In one exemplary embodiment, the first and second thermally conductive layers 120, 130 are part of a same substrate and are constructed of the same material, but have different thicknesses from one another.

The first and second thermally conductive layers 120, 130 are configured to transfer heat energy from the battery cells 60, 70 to the first plate portion 100 which further transfers the heat energy to the second plate portion 102 and the base plate 110. The base plate 110 transfers the heat energy to the cooling plate 20.

Also, in one exemplary embodiment, sides of the thermally conductive layers 120, 130 contacting the first and second battery cells 60, 70, respectively, have a roughness average (RA) in a range of 0.8-4.0 micro inches. Of course, in an alternative embodiment, the thermally conductive layers 120, 130 could have an RA less than 0.8 or greater than 4.0.

Also, in one exemplary embodiment, each of the thermally conductive layers 120, 130 includes a pressure sensitive adhesive (not shown) disposed on one side of the respective layer that is used to attach the respective layer on the first plate portion 100. Of course, in alternative embodiments, the thermally conductive layers 120, 130 could be coupled to the first plate portion 100 utilizing other coupling devices known to those skilled in the art.

Figure 3:
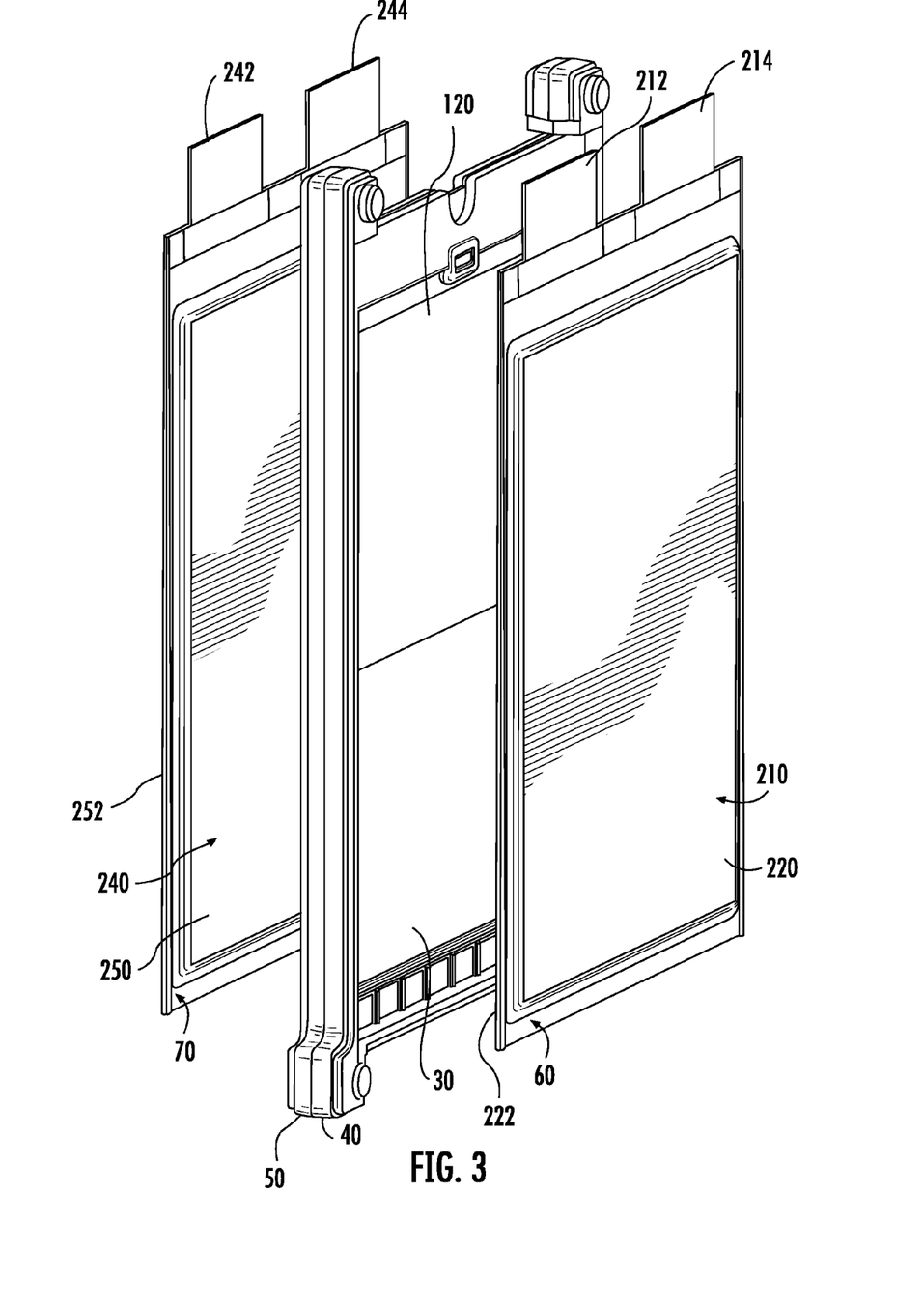
FIG. 3 is an exploded view of a portion of the battery cell assembly of FIG. 1.
Figure 4:
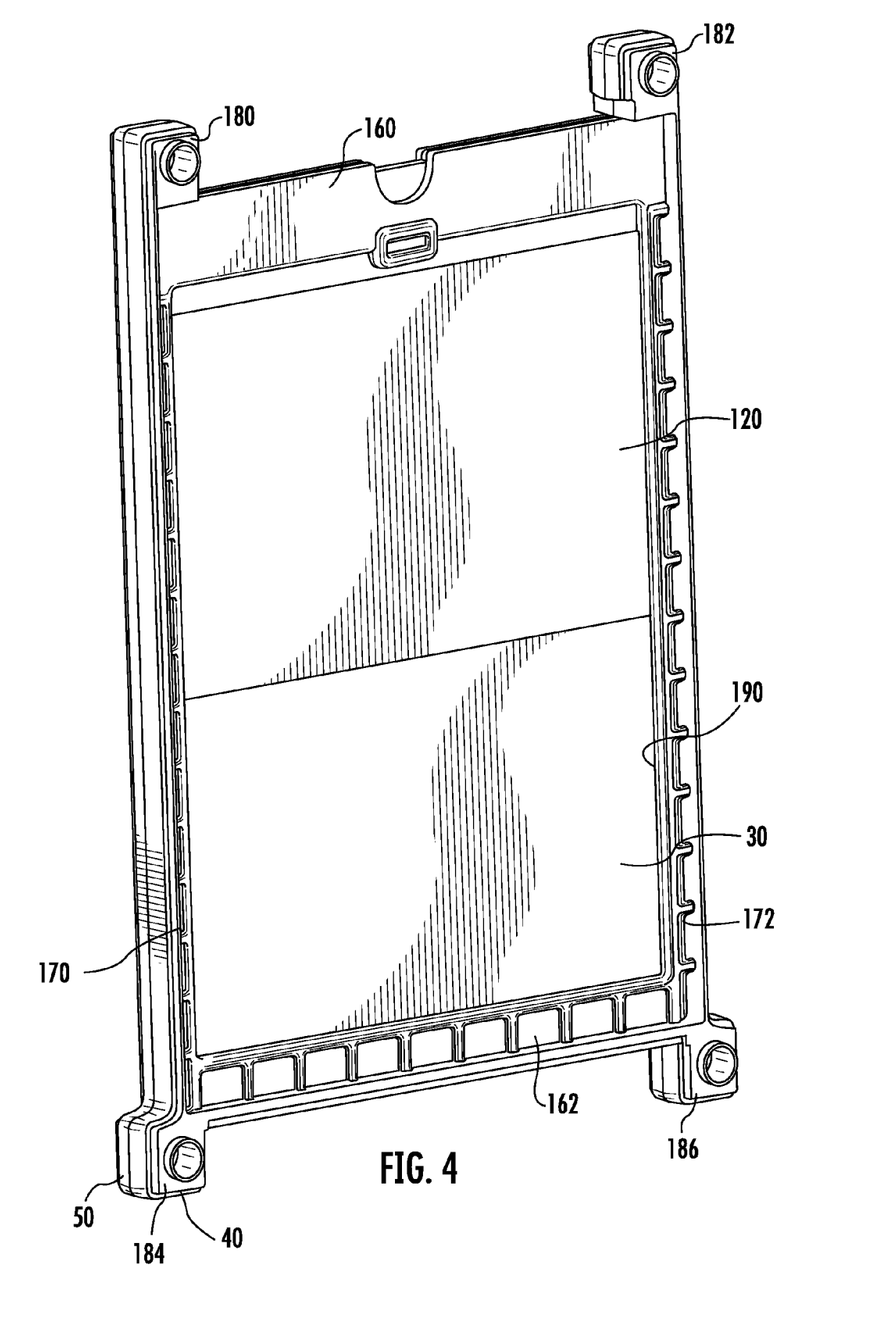
FIG. 4 is an assembled view of the portion of the battery cell assembly of FIG. 3.
Figure 5:
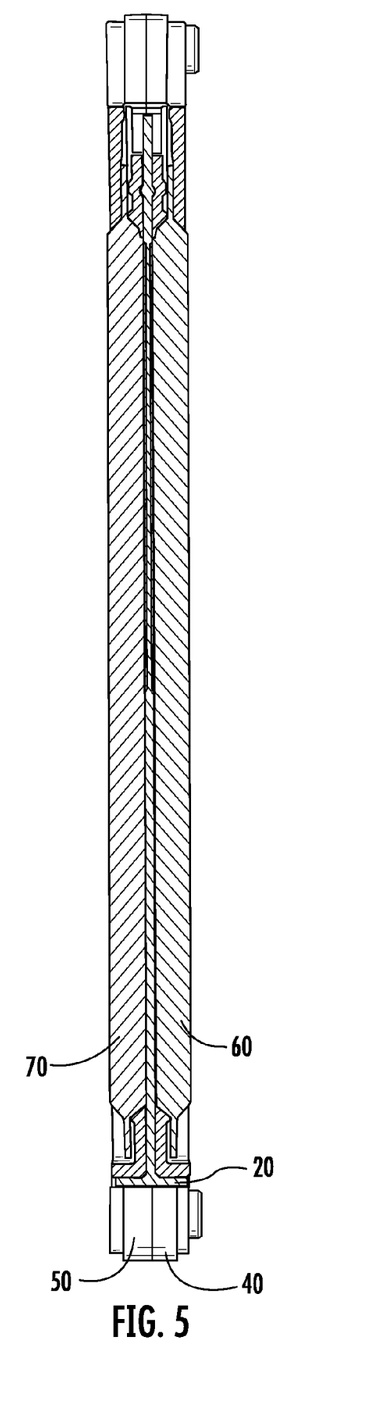
FIG. 5 is a side view of the portion of the battery cell assembly of FIG. 4.

Referring to FIGS. 3-5, the first and second rectangular ring-shaped frame members 40, 50 are configured to hold the cooling fin 30 therebetween and to be coupled together.

The first rectangular ring-shaped frame member 40 includes first and second horizontal walls 160, 162, first and second vertical walls 170, 172, and extension members 180, 182, 184, 186. In one exemplary embodiment, the first rectangular ring-shaped frame member 40 is constructed of plastic. The first horizontal wall 160 is disposed between the first and second vertical walls 170, 172. The second horizontal wall 162 is disposed between the first and second vertical walls 170, 172. The extension portions 180, 182 extend outwardly from the first horizontal wall 160, and the extension portions 184, 186 extend outwardly from the second horizontal wall 162. The first and second horizontal walls 160, 162 and the first and second vertical walls 170, 172 define an open region 190 therebetween. The thermally conductive layer 120 is disposed in the open region 190 such that the thermally conductive layer 120 contacts the battery cell 60 disposed against both the thermally conductive layer 120 and the second plate portion 102.

The second rectangular ring-shaped frame member 50 has an identical structure as the first rectangular ring-shaped frame member 40. The thermally conductive layer 130 is disposed in an open region of the frame member 50 such that the thermally conductive layer 130 contacts the battery cell 70 disposed against both the thermally conductive layer 130 and the second plate portion 102.

Referring to FIG. 3, the battery cells 60, 70 are each configured to generate an operational voltage. In one exemplary embodiment, each of the battery cells 60, 70 are pouch-type lithium-ion battery cells. Of course, in alternative embodiments, other types of battery cells known to those skilled in the art could be utilized. Also, in an exemplary embodiment, the battery cells 60, 70 are electrically coupled in series to one another.

The first battery cell 60 includes a rectangular-shaped body portion 210 and electrical terminals 212, 214 extending from the body portion 210. The body portion 210 includes rectangular-shaped side surfaces 220, 222. The first battery cell 60 is disposed against both the first thermally conductive layer 120 and the second plate portion 102 of the cooling fin 30.

The second battery cell 70 includes a rectangular-shaped body portion 240 and electrical terminals 242, 244 extending from the body portion 240. The body portion 240 includes rectangular-shaped side surfaces 250, 252. The second battery cell 70 is disposed against both the second thermally conductive layer 130 and the second plate portion 102 of the cooling fin 30.

Referring to FIGS. 1, 3, 6 and 8, a flowchart of a method for manufacturing the battery cell assembly 10 in accordance with another exemplary embodiment is provided.

Figure 8:
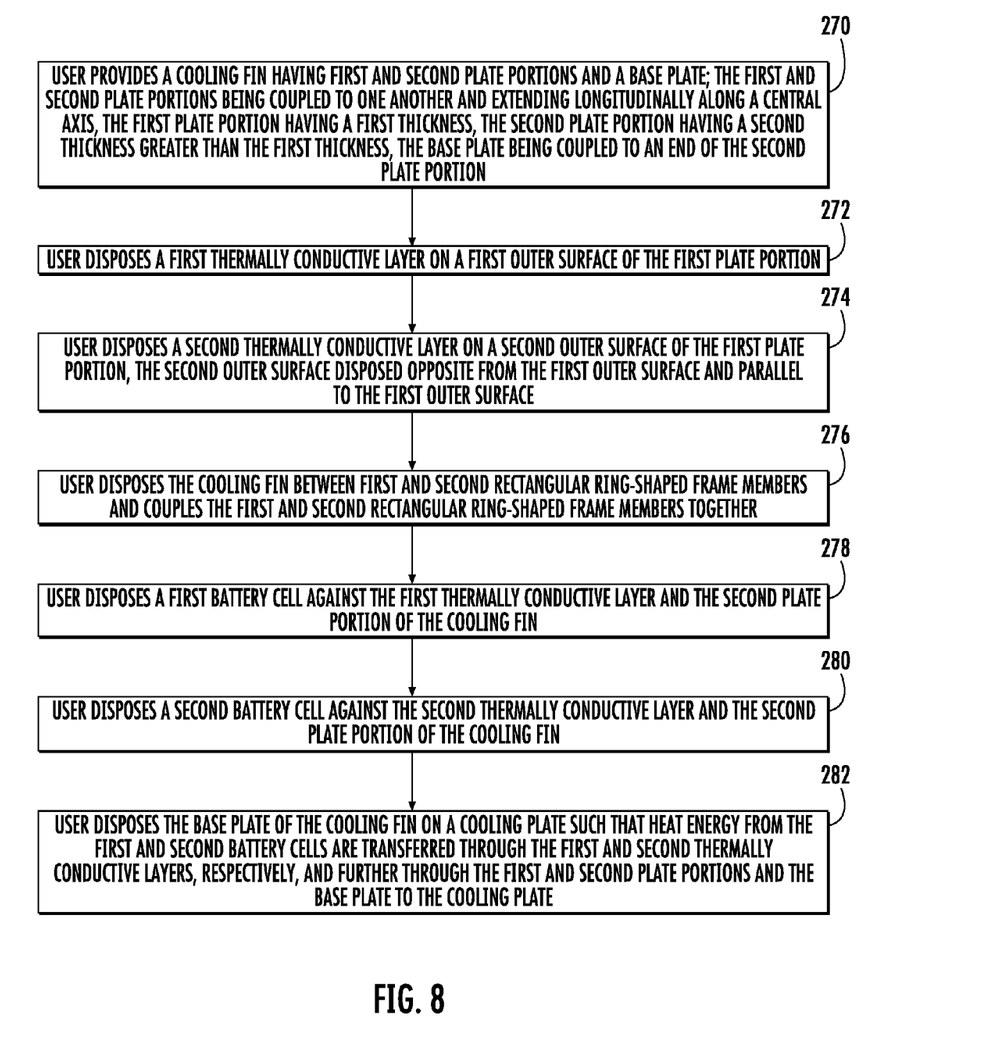
FIG. 8 is a flowchart of a method for manufacturing the cooling fin of FIG. 1 in accordance with another exemplary embodiment.

At step 270, a user provides the cooling fin 30 having the first and second plate portions 100, 102 and the base plate 110. The first and second plate portions 100, 102 are coupled to one another and extend longitudinally along the central axis 132. The first plate portion 100 has a first thickness. The second plate portion 102 has a second thickness greater than the first thickness. The base plate 110 is coupled to an end of the second plate portion 102.

At step 272, the user disposes the first thermally conductive layer 120 on a first outer surface 144 of the first plate portion 100.

At step 274, the user disposes the second thermally conductive layer 130 on a second outer surface 146 of the first plate portion 100. The second outer surface 146 disposed opposite from the first outer surface 144 and parallel to the first outer surface 144.

At step 276, the user disposes the cooling fin 30 between first and second rectangular ring-shaped frame members 40, 50 and couples the first and second rectangular ring-shaped frame members 40, 50 together.

At step 278, the user disposes the first battery cell 60 against the first thermally conductive layer 120 and the second plate portion 102 of the cooling fin 30.

At step 280, the user disposes the second battery cell 70 against the second thermally conductive layer 130 and the second plate portion 102 of the cooling fin 30.

At step 282, the user disposes the base plate 110 of the cooling fin 30 on the cooling plate 20 such that heat energy from the first and second battery cells 60, 70 are transferred through the first and second thermally conductive layers 120, 130, respectively, and further through the first and second plate portions 100, 102 and the base plate 110 to the cooling plate 20.

The battery cell assembly 10 and the method for manufacturing the battery cell assembly 10 provide a substantial advantage over other battery cell assemblies and methods. In particular, the battery cell assembly 10 and the method provide a technical effect of utilizing a cooling fin with a thermally conductive layer disposed on a first plate portion of the cooling fin that is distal from a cooling plate such that a portion of a battery cell disposed against the thermally conductive layer has a substantially equal temperature as another portion of the battery cell disposed against a second plate portion of the cooling fin disposed proximate to the cooling plate.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
   a cooling plate;
   a cooling fin having first and second plate portions and a first thermally conductive layer; the first and second plate portions being coupled to one another and extending longitudinally along a central axis, the first plate portion having a first thickness, the second plate portion having a second thickness greater than the first thickness, the first thermally conductive layer disposed on a first outer surface of the first plate portion, the cooling fin configured to thermally communicate with the cooling plate; and
   a first battery cell disposed against the first thermally conductive layer and the second plate portion of the cooling fin.

2. The battery cell assembly of claim 1, wherein the first and second plate portions comprise first and second substantially rectangular-shaped plate portions, respectively, and the cooling fin further includes a base plate coupled to an end of the second plate portion, the base plate being disposed on the cooling plate.

3. The battery cell assembly of claim 2, wherein the base plate extends substantially perpendicular to the second plate portion.

4. The battery cell assembly of claim 2, wherein the first thickness of the first plate portion is perpendicular to the central axis.

5. The battery cell assembly of claim 4, wherein the second thickness of the second plate portion is perpendicular to the central axis.

6. The battery cell assembly of claim 2, wherein the first and second plate portions and the base plate are constructed of aluminum.

7. The battery cell assembly of claim 1, wherein the first thermally conductive layer is rectangular-shaped and is sized to cover a portion of a substantially rectangular-shaped side surface of the first battery cell.

8. The battery cell assembly of claim 1, wherein the first thermally conductive layer has a roughness average in a range of 0.8-4.0 micro-inches.

9. The battery cell assembly of claim 1, further comprising a second thermally conductive layer disposed on a second outer surface of the first plate portion, the second outer surface being disposed opposite from the first outer surface and parallel to the first outer surface.

10. The battery cell assembly of claim 9, further comprising a second battery cell disposed against the second thermally conductive layer and the second plate portion.

11. The battery cell assembly of claim 1, further comprising first and second rectangular ring-shaped frame members, the cooling fin being disposed between the first and second rectangular ring-shaped frame members, the first and second rectangular ring-shaped frame members being coupled together.

12. The battery cell assembly of claim 1, wherein the first thermally conductive layer has a thermal conductivity greater than a thermal conductivity of each of the first and second plate portions.

13. The battery cell assembly of claim 1, wherein the first thermally conductive layer comprises a graphite layer.

14. A method for manufacturing a battery cell assembly, comprising:
   providing a cooling fin having first and second plate portions extending longitudinally along a central axis that are coupled to one another, the first plate portion having a first thickness, the second plate portion having a second thickness greater than the first thickness;
   disposing a first thermally conductive layer on a first outer surface of the first plate portion; and
   disposing a first battery cell against the first thermally conductive layer and the second plate portion of the cooling fin.

15. The method of claim 14, wherein the cooling fin further includes a base plate coupled to the second plate portion, the method further comprising disposing the base plate on a cooling plate.

16. The method of claim 14, further comprising disposing a second thermally conductive layer on a second outer surface of the first plate portion, the second outer surface being disposed opposite from the first outer surface and parallel to the first outer surface.

17. The method of claim 16, further comprising disposing a second battery cell against the second thermally conductive layer and the second plate portion.

18. The method of claim 14, further comprising disposing the cooling fin between first and second rectangular ring-shaped frame members, the first and second rectangular ring-shaped frame members being coupled together.

* * * * *